(12) United States Patent
Slavenburg et al.

(10) Patent No.: US 8,085,217 B2
(45) Date of Patent: Dec. 27, 2011

(54) SYSTEM, METHOD, AND COMPUTER PROGRAM PRODUCT FOR COMPENSATING FOR CROSSTALK DURING THE DISPLAY OF STEREO CONTENT

(75) Inventors: Gerrit A. Slavenburg, Los Altos, CA (US); Thomas F. Fox, Palo Alto, CA (US); David Robert Cook, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1312 days.

(21) Appl. No.: 11/463,277

(22) Filed: Aug. 8, 2006

(65) Prior Publication Data

US 2008/0036696 A1 Feb. 14, 2008

(51) Int. Cl.
*G09G 5/00* (2006.01)
(52) U.S. Cl. .............................................. 345/8; 348/42
(58) Field of Classification Search ................... 345/6, 9, 345/213, 419; 348/42, 53, 55–60
See application file for complete search history.

(56) References Cited

U.S. PATENT DOCUMENTS

| | | | |
|---|---|---|---|
| 5,936,663 A | | 8/1999 | Tabata et al. |
| 6,061,179 A | * | 5/2000 | Inoguchi et al. ............... 359/464 |
| 6,094,216 A | * | 7/2000 | Taniguchi et al. ............... 348/51 |
| 6,532,008 B1 | * | 3/2003 | Guralnick ..................... 345/419 |
| 7,385,625 B2 | * | 6/2008 | Ohmura et al. .................. 348/51 |
| 2001/0005185 A1 | | 6/2001 | Endo et al. |
| 2006/0268104 A1 | * | 11/2006 | Cowan et al. ................... 348/42 |

FOREIGN PATENT DOCUMENTS

| | | |
|---|---|---|
| JP | 08/331600 | 12/1996 |
| JP | 2000134644 A | 5/2000 |
| JP | 2001-054142 | 2/2001 |
| JP | 2001-054143 | 2/2001 |
| JP | 2001258052 A | 9/2001 |

OTHER PUBLICATIONS

Korean Office Action summary from application No. 10-2007-79635 mailed on Feb. 13, 2009.
Office Action from Taiwan Patent Application No. 096129058, dated Jan. 21, 2011.

(Continued)

*Primary Examiner* — Quan-Zhen Wang
*Assistant Examiner* — Yuk Chow
(74) *Attorney, Agent, or Firm* — Zilka-Kotab, PC (57) ABSTRACT

A system, method, and computer program product are provided for compensating for crosstalk during the display of stereo content. In use, display content is received for being outputted utilizing a display system. Such display system inherently exhibits crosstalk, whereby an amount of left eye display content is displayed to a right eye of a user and an amount of right eye display content is displayed to a left eye of the user. Thus, prior to outputting the display content utilizing the display system, the display content is processed utilizing a graphics processor to compensate for the amount of the left eye display content to be displayed to the right eye of the user and the amount of the right eye display content to be displayed to the left eye of the user. In one embodiment where the crosstalk is a function of pixel location, the compensation may also be a function of pixel location. [e.g. in the case of a liquid crystal display (LCD), etc.].

28 Claims, 7 Drawing Sheets

OTHER PUBLICATIONS

Office Action from Chinese Patent Application No. 2007101432182, dated Jan. 29, 2010.
Office Action from Chinese Patent Application No. 2007101432182, dated Mar. 20, 2009.
Japanese Office Action Summary from application No. 2007-201043 mailed to us on Aug. 3, 2010.
U.S. Appl. No. 11/462,535, filed Aug. 4, 2006.
U.S. Appl. No. 11/462,529, filed Aug. 4, 2006.
"i-O Display Systems" http://www.i-glassesstore.com/index.html_ p. 1-2.
B. Javidi et al. "Three Dimensional Television, Video, and Display Technologies" Springer p. 25, on May 1, 2002.
Office Action from Taiwan Patent Application No. 096129058, dated Jul. 22, 2011.
Final Notice of Reasons for Rejection from Japanese Patent Application No. 2007-201043, dated Aug. 9, 2011.

* cited by examiner

SYSTEM, METHOD, AND COMPUTER PROGRAM PRODUCT FOR COMPENSATING FOR CROSSTALK DURING THE DISPLAY OF STEREO CONTENT

FIELD OF THE INVENTION

The present invention relates to video displays, and more particularly to displaying stereo content utilizing video displays.

BACKGROUND

Various display devices are equipped for both mono and stereo viewing. Unlike mono viewing, stereo viewing involves the display of separate content for the right and left human eye. Specifically, such stereo viewing requires the presentation of a left image to the left human eye and a right image to the right human eye. In one particular type of stereo viewing, namely time sequential stereo viewing, such left and right images are presented in an alternating manner.

Numerous technologies are capable of providing such stereo viewing. For example, dual projectors provide stereo viewing with polarized light and polaraized glasses. Further, time sequential displays [e.g. cathode ray tube (LCDs), etc.] provide stereo viewing when combined with active shutter glasses that open corresponding left and right shutters at the appropriate time. Lenticular displays constitute yet another example of displays with stereo viewing capabilities. Lenticular displays radiate different views into viewing "cones" so that each eye (in a different cone) is subjected to a different image.

In each of such stereo viewing technologies, crosstalk (e.g. leakage, etc.) typically occurs. Crosstalk refers to the situation where left eye display content is displayed to a right eye of a user and right eye display content is displayed to a left eye of the user. Such crosstalk is particularly visible when a bright white object occurs on a dark background, and when parallax between a left and right image of the object is large. In such cases, a perception of a "ghost" of the object results, hence the perceived effect is often called "ghosting." Ghosting reduces a quality of a stereo viewing experience.

In the context of the aforementioned DLP projectors with polarized light, crosstalk may occur due to a limited rejection of an unwanted image by associated polarized glasses. Further, in the case of time sequential displays with shutter glasses, crosstalk may occur due to both display persistence and limited image rejection by a "dark" state of associated shutters. It may also occur due to shutter glasses opening/closing time inaccuracies, etc. In the case of lenticular displays, optical properties of such display technology may cause crosstalk between adjacent viewing cones.

Figure 1:
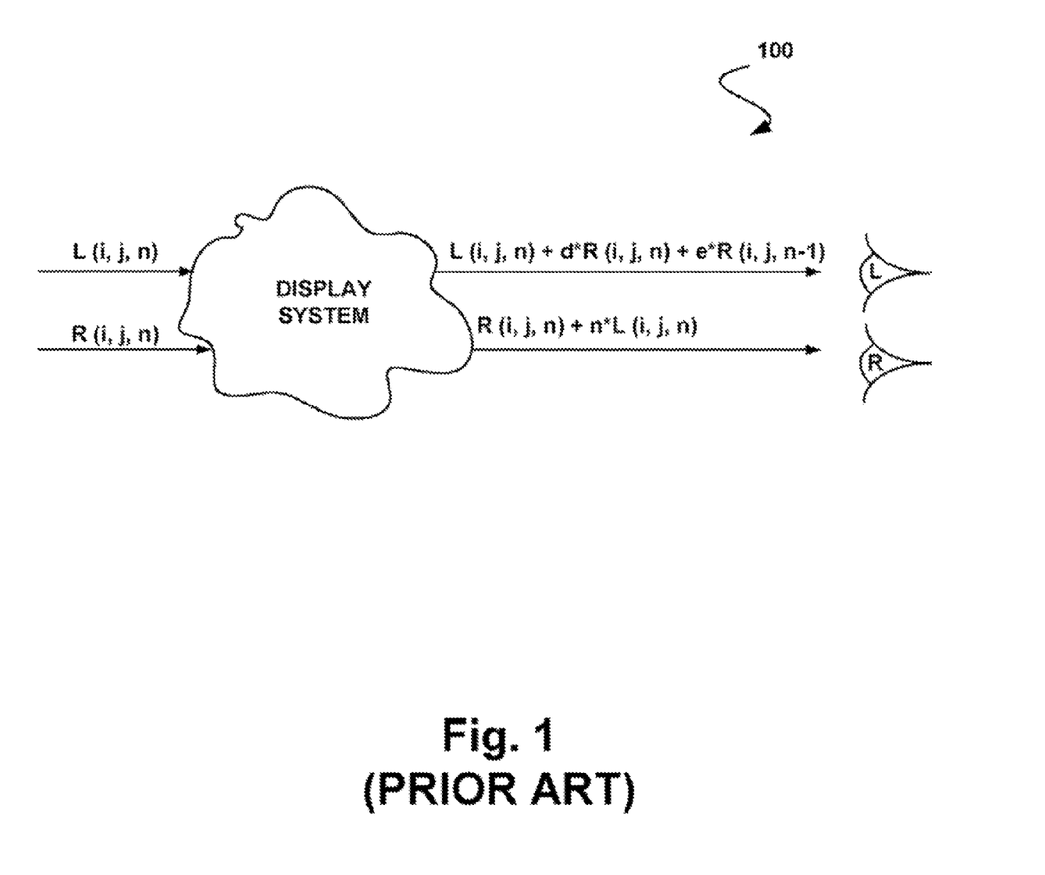
FIG. 1 illustrates a display system that exhibits crosstalk, in accordance with the prior art.

Prior art FIG. 1 illustrates a display system 100 that exhibits crosstalk, in accordance with the prior art. As shown, L(i,j,n) corresponds with an image frame sent to the display system 100 to be presented to a left eye at time=n, consisting of a 2-dimensional array of pixels. Specifically, L(i,j,n) is the value of the pixel at x-coordinated=i, at y-coordinate=j, and at time t=n. Similarly, R(i,j,n) corresponds to an image frame sent to the display system 100 to be presented to a right eye.

In use, however, the actual light reaching each eye contains the appropriate image in addition to some error components due to crosstalk. The term d*R(i,j,n), for example, represents crosstalk from a current right frame into the left eye, such as might occur in the aforementioned dual projection/polarized systems, etc. In the context of time-sequential stereo viewing, it is possible that there may even be crosstalk originating from a previous image. For example, if it is assumed that the time sequence order is L(n−1), R(n−1), L(n), R(n), etc., it is possible for a remnant of R(n−1) image to reach the left eye at time=n. This is represented by the term e*R(i,j,n−1). Still yet, the term n*L(i,j,n) represents a crosstalk from a current left frame into the right eye.

As mentioned earlier, the ghosting that results from the foregoing crosstalk serves to reduce the quality of a stereo viewing experience. There is thus a need for overcoming these and/or other problems associated with the prior art.

SUMMARY

A system, method, and computer program product are provided for compensating for crosstalk during the display of stereo content. In use, display content is received for being outputted utilizing a display system. Such display system inherently exhibits crosstalk, whereby an amount of left eye display content is displayed to a right eye of a user and an amount of right eye display content is displayed to a left eye of the user. Thus, prior to outputting the display content utilizing the display system, the display content is processed utilizing a graphics processor to compensate for the amount of the left eye display content to be displayed to the right eye of the user and the amount of the right eye display content to be displayed to the left eye of the user. In one embodiment where the crosstalk is a function of pixel location [e.g. in the case of a liquid crystal display (LCD), etc.], the compensation may also be a function of pixel location.

BRIEF DESCRIPTION OF THE DRAWINGS

Prior art

DETAILED DESCRIPTION

Figure 2:
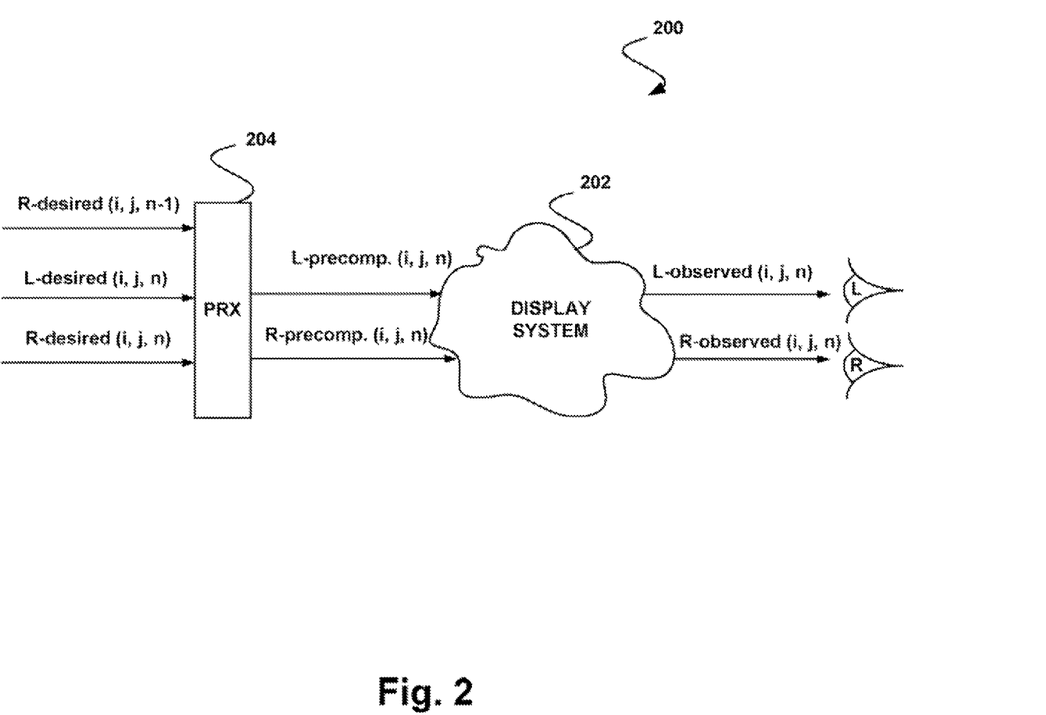
FIG. 2 shows a system for compensating for crosstalk during the display of stereo content, in accordance with one embodiment.

FIG. 2 shows a system 200 for compensating for crosstalk during the display of stereo content, in accordance with one embodiment. As shown, a display system 202 is provided that receives display content for the purpose of outputting the same to a user. Similarly to prior art display systems (e.g. leakage, etc.), whereby an amount of left eye display content is displayed to a right eye of a user and an amount of right eye display content is displayed to a left eye of the user. In the context of the present description, the display content may include images, portions thereof (e.g. pixel information, etc.), and/or anything else capable of being processed for the purpose of being displayed to the user.

In various embodiments, the display system 202 may include, but is not limited to a dual projector with polarized light and polarized glasses, a time sequential display [e.g. cathode ray tube (CRT) display, a digital light processing (DLP) projector, a liquid crystal display (LCD), etc.] in possible combination with shutter glasses that open corresponding left and right shutters at the appropriate time, a lenticular display, etc. Of course, in the context of the present description, the display system 202 may include any display that inherently exhibits crosstalk, as defined above. For example, liquid crystal on silicon (LCOS) displays, plasma displays, etc. are also contemplated.

To address such crosstalk, a processor 204 is provided for processing the display content. In the context of the present description, the processor 204 may refer to any hardware, software or combination thereof capable of addressing the crosstalk. Still yet, in one embodiment, the processor 204 may take the form of a graphics processor [e.g. graphics processing unit (GPU), etc.] that is capable of graphics processing, in addition to addressing the crosstalk. In such embodiment, a programmable shader may optionally be used for such purpose. Shaders include programs that define surface properties of objects to be displayed. While the processor 204 is shown to be separate from the display system 202, it should be noted that embodiments are contemplated wherein the processor 204 and the display system 202 are incorporated into a single system, etc.

By this structure, prior to outputting the display content utilizing the display system 202, the display content is processed utilizing the processor 204. Specifically, such processing compensates for the amount of the left eye display content to be displayed to the right eye of the user and the amount of the right eye display content to be displayed to the left eye of the user.

With reference to FIG. 2, the processor 204 may, in one embodiment, accomplish the foregoing compensation by computing pre-compensated images, L-precomp(i,j,n) ad R-precomp(i,j,n), using desired left and right images at t=n, namely L-desired(i,j,n) and R-desired(i,j,n). In one optional embodiment where the display system 202 includes a time sequential display, the processor 204 may also utilize a respective image at t=n−1 [e.g. R-desired(i,j,n−1), etc.].

In use, the processor 204 may thus compute the pre-compensated images, L-precomp(i,j,n) and R-precomp(i,j,n), such that when they are sent to the display system 202 with the known crosstalk, the net effect is that each eye observes images L-observed(i,j,n) and R-observed(i,j,n) that, to the extent possible, match the desired images, L-desired(i,j,n) and R-desired(i,j,n). By this feature, crosstalk and associated ghosting may be reduced, at least in part.

More illustrative information will now be set forth regarding various optional architectures and features with which the foregoing functionality may or may not be implemented, per the desires of the user. For instance, examples of compensation algorithms will now be set forth for accomplishing the foregoing functionality. It should be strongly noted that the following information is set forth for illustrative purposes and should not be construed as limiting in any manner. For example, any compensation algorithm may be used that results in the reduction of crosstalk, etc. To this end, any of the following features may be incorporated with or without the exclusion of other features described.

Figure 3:
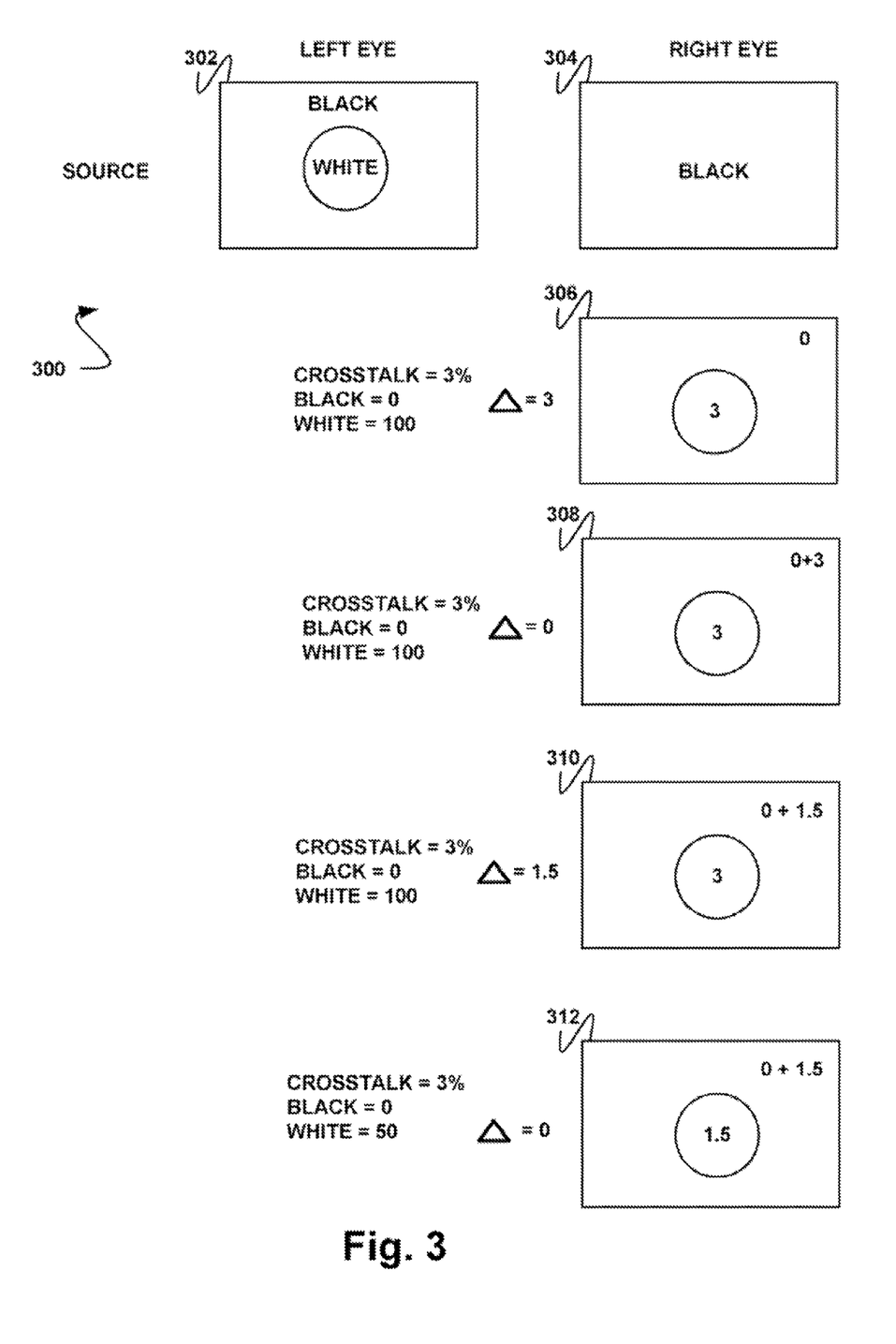
FIG. 3 illustrates various compensation methods for compensating for crosstalk during the display of stereo content, in accordance with various embodiments.

FIG. 3 illustrates various compensation methods 300 for compensating for crosstalk during the display of stereo content, in accordance with various embodiments. As an option, the present methods 300 may be carried out in the context of the system of FIG. 2. Of course, however, the methods 300 may be implemented in any desired environment. Further, the definitions introduced hereinabove apply during the following description.

Before referring specifically to FIG. 3, it should be first noted that the various methods 300 are set forth in the context of a time-sequential stereo system and images are displayed in the following order: L(n−1), R(n−1), L(n), R(n), and so forth. Still yet, in the present example, it is assumed that 3% of each image persists on the associated display system and therefore reaches the incorrect eye causing crosstalk. For purpose of clarity, it is further assumed, in the present embodiment, that the images are void of color.

Thus, in the current example (when there is no compensation), the observed images, L-observed(i,j,n) and R-observed (i,j,n), may be represented by Equations #1 and #2 below.

Equations #1 and #2

$$L\text{-observed}(i,j,n) = L\text{-desired}(i,j,n) + 0.03 * R\text{-desired}(i,j,n-1) \quad \text{Eq.1}$$

$$R\text{-observed}(i,j,n) = R\text{-desired}(i,j,n) + 0.03 * L\text{-desired}(i,j,n-1) \quad \text{Eq.2}$$

Of course, in an embodiment where the order was R(n−1), L(n−1), R(n), L(n); the R-observed(i,j,n) value would reflect previous left eye content.

With reference again to FIG. 3, results of the above crosstalk are illustrated in the context of left eye content 302 including a white object (e.g. value=100) on a black backdrop (e.g. value=0). Further, right eye content 304 is shown to include only a black backdrop (e.g. value=0). Results of the Equations #1 and #2 are shown in resultant right eye content 306 where a ghost (e.g. value=3) is displayed against the black backdrop (e.g. value=0), providing a delta of 3 (which is quite noticeable).

To compensate for such crosstalk reflected in the above equations, the desired images may be pre-processed (in the context of the system 200 of FIG. 2, for example) to provide compensated images L-precomp(i,j,n) and R-precomp(i,j,n) using the calculations set forth in Equations #3 and #4 below.

Equations #3 and #4

$$L\text{-precomp}(i,j,n) = L\text{-desired}(i,j,n) - 0.03 * R\text{-desired}(i,j,n-1) \quad \text{Eq.3}$$

$$R\text{-precomp}(i,j,n) = R\text{-desired}(i,j,n) - 0.03 * L\text{-desired}(i,j,n) \quad \text{Eq.4}$$

Thus, with respect to the left eye only (for purposes of clarity), the actual light reaching such eye at time=n (with the compensation incorporated) may be represented by Equation #5 below. Thus, Equations #3 and #4 serve to reduce a portion of the left eye display content to be displayed to the right eye of the user and a portion of the right eye display content displayed to the left eye of the user.

Equation #5

$$L\text{-observed}(i,j,n) = L\text{-precomp}(i,j,n) + 0.03 * R\text{-precomp}(i,j,n-1)$$

Substitution of Equation #3 in Equation #5 provides Equation #5' below:

Equation 190 5'

$$L\text{-observed}(i,j,n) = L\text{-desired}(i,j,n) - 0.03 * R\text{-desired}(i,j,n-1) + 0.03 * R\text{-precomp}(i,j,n-1)$$

Further, substitution of Equation #4 in Equation #5' at time=n provides Equation #5" below:

Equation #5"

$$L\text{-observed}(i,j,n) = L\text{-desired}(i,j,n) - 0.0009 * L\text{-desired}(i,j,n-1)$$

As shown, the crosstalk has been reduced from 3% to less than $1/1000^{th}$ of the original amount. In addition, instead of crosstalk from right to left, which causes a horizontally separated "ghost," the remaining crosstalk is from a previous left image, which is likely a lot more correlated and less distracting (if visible at all).

One item to note regarding the above example is that it leaves open the possibility of dealing with negative light (which is impossible). Specifically, assume a situation where L-desired(i,j,n) contains a fully black pixel at coordinate x1, y1, [i.e. L-desired(x1,y1,n)=0], and R-desired(i,j,n−1) contains a fully white pixel [i.e. R-desired(x1,y1,n−1)=100]. In such scenario, Equation #3 above would require L-precomp (x1,y1,n) to be −3. Of course, providing such negative light is impossible. Thus, in the above example, some cases of ghosting would not be able to be compensated, namely in situations where a fully black pixel value exists.

Thus, in one embodiment, the aforementioned compensation may be carried out only when possible. In other words, Equations #3 and #4 may be applied only when an outcome is not negative. With reference again to FIG. 3, right eye content 306 would result when negative light is required and Equations #3 and #4 are thus not applied. Further, in other embodiments where a negative value results, a black pixel may simply be displayed. This result in elimination of most ghosting, except in totally black areas.

In another embodiment, a black level of at least a portion of the display content may be increased. Equations #6 and #7 below illustrate an exemplary manner in which this may be accomplished.

Equations #6 and #7

$$L\text{-precomp}(i,j,n) = L\text{-desired}(i,j,n) - 0.03 * R\text{-desired}(i,j,n-1) + 0.03 \quad \text{Eq. 6}$$

$$R\text{-precomp}(i,j,n) = R\text{-desired}(i,j,n) - 0.03 * L\text{-desired}(i,j,n) + 0.03 \quad \text{Eq. 7}$$

In other words, the black level is increased to match a level of leakage that results when a preceding opposite image is 100% white. For example, if a 100% white image leaks 3% into the other eye, the black level may be set to 3%. Thus, an actual light reaching a left eye can be derived in a manner similar to Equation #5 above. See Equation #8 below, for example.

Equation #8

$$L\text{-observed}(i,j,n) = L\text{-desired}(i,j,n) + 0.0309 - 0.0009 * L\text{-desired}(i,j,n-1)$$

Thus, ghosting may be combated, from right into left, without necessarily resorting to negative light values. The visual result, however, may be an image with "grayer blacks," but with significantly reduced ghosting. With reference again to FIG. 3, an increase in black level (e.g. value=3) may thus be employed (as shown in right eye content 308), resulting in full compensation (delta=0).

In still another embodiment, a compromise may be struck between the above embodiments. For example, a smaller amount of brightness may be added, which may help reduce ghosting, but without attempting to compensate for all ghosting in the darkest areas of the screen. With reference yet again to FIG. 3, an increase in black level (e.g. value=1.5) may be employed (as shown in right eye content 310), result in partial compensation (delta=1.5).

While the compensation of the previous embodiment is merely partial, the foregoing compensation may be complete in still other embodiments involving objects with a different brightness level. For instance, the final example in FIG. 3 shows results of the above crosstalk in the context of left eye content 302 including a white object of a lesser value (e.g. value=50) on a black backdrop (e.g. value=0), causing the display of a ghost (e.g. value=1.5). As shown, the same increase in black level (e.g. value=1.5) may be employed (as shown in right eye content 312) in such embodiment to accomplish full compensation (delta=0).

Of course, it should be noted that the aforementioned values are set forth for illustrative purposes only and should not be construed as limiting in any manner whatsoever. Even still, additional intermediate modes of compensation are also contemplated in the context of backdrops/objects having different brightness levels, etc.

Figure 4:
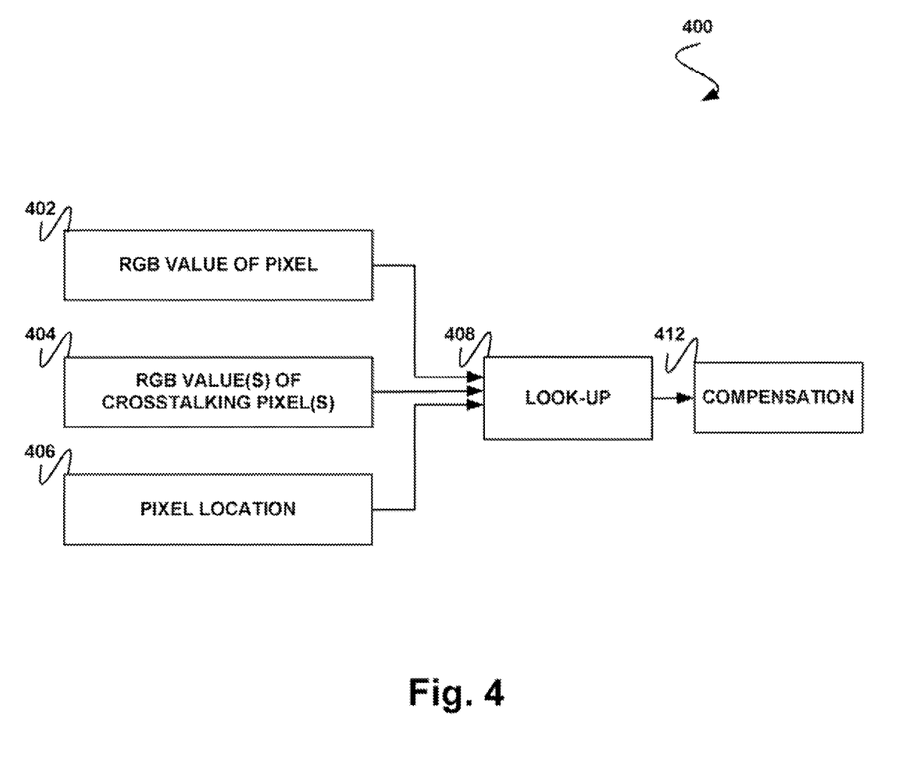
FIG. 4 illustrates another system for compensating for crosstalk during the display of stereo content, in accordance with another embodiment.

FIG. 4 illustrates another system 400 for compensating for crosstalk during the display of stereo content, in accordance with another embodiment. As an option, the present system 400 may be carried out in the context of the system and methods of FIGS. 2-3. Of course, however, the system 400 may be implemented in any desired environment. Again, the definitions introduced hereinabove apply during the following description.

As shown, compensation 412 may be performed utilizing a look-up operation 408. Such look-up operation 408 may involve a comprehensive table that provides appropriate compensation equations and/or values (e.g. see the above equations/values, for example), based on specific variations of input indicative of a specific crosstalk to be combated.

The input, in a most comprehensive embodiment, may include a red, green, and blue component value of a pixel to be displayed. See input 402. Further, the input may include a red, green, and blue component values of a pixel tat is a source of crosstalk (e.g. a pixel previously and/or currently displayed that includes opposite eye content, etc.). See input 404. As mentioned previously, such may be beneficial in time sequential stereo viewing. Even still, as noted in input 406, the compensation 412 is performed as a function of a pixel location. Such location may include x and/or y coordinates of a pixel, a scan line of a pixel, etc. More information regarding such location-dependence of the crosstalk will be described hereinafter in greater detail during reference to subsequent figures, in the specific context of a stereo shutter glasses embodiment.

Thus, the compensation 412 may be carried out on a pixel-by-pixel basis, a color component-by-color component basis, etc., where each pixel each has associated pixel-specific input. In other words, equations (like the ones discussed hereinabove) may be performed for each color component of each pixel, etc. To this end, crosstalk due to display persistence may be accommodated. Further, a separate crosstalk factor for each color component may be addresses separately. In some embodiments, the compensation 412 may even accommodate situations where the crosstalk is non-linear (e.g. the leakage factor may depend on an exact RGB value of a source and destination). Of course, the compensation 412 may take into account any desired factor that may promp crosstalk.

Figure 5:
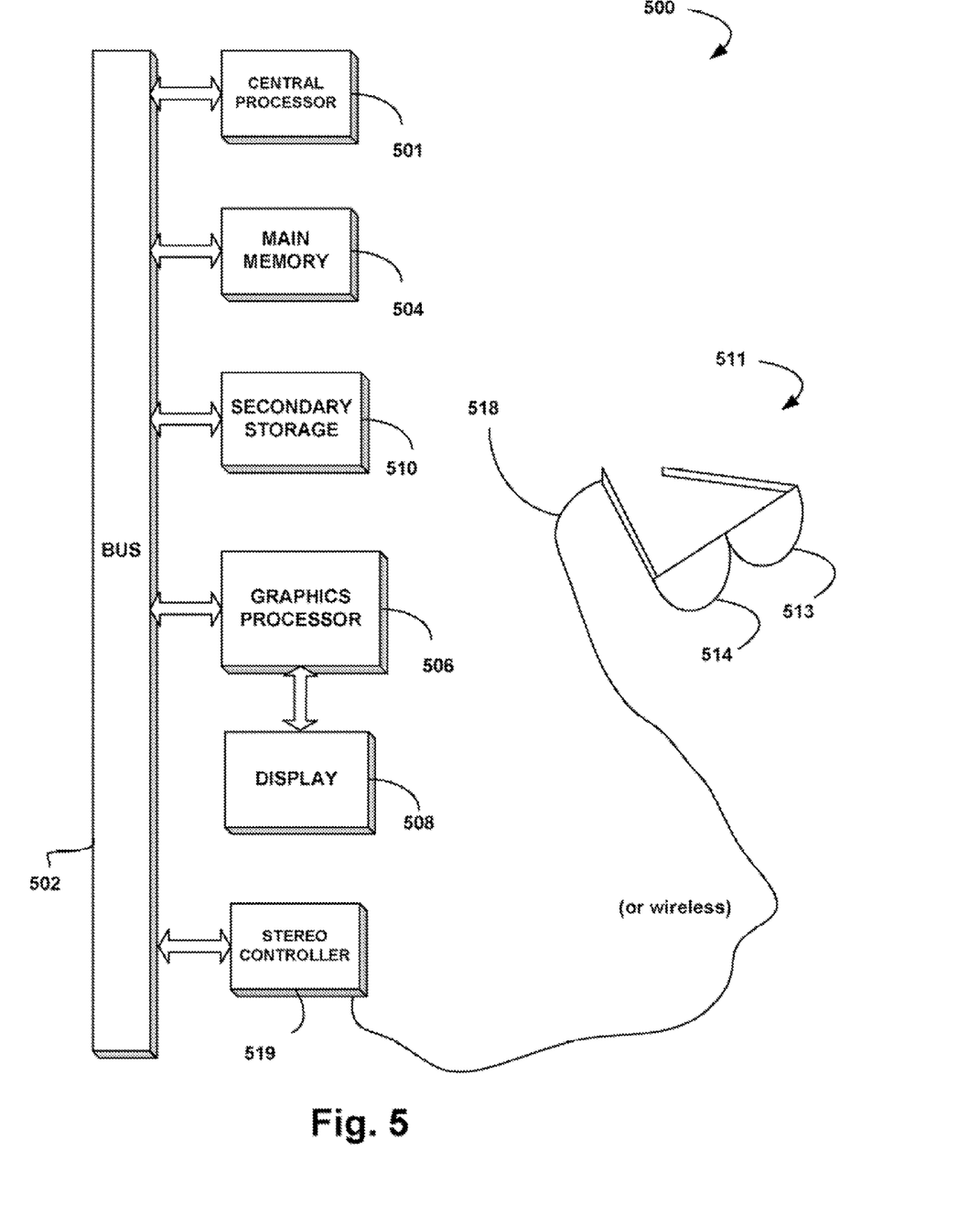
FIG. 5 illustrates an exemplary computer system in which the various architecture and/or functionality of various embodiments may be implemented.

FIG. 5 illustrates an exemplary computer system 500 in which the various architecture and/or functionality of different embodiments may be implemented. As shown, a computer system 500 is provided including at least one host processor 501 which is connected to a communication bus 502. The computer system 500 also includes a main memory 504. Control logic (software) and data are stored in the main memory 504 which may take the form of random access memory (RAM).

The computer system 500 also includes a graphics processor 506 and a display 508 in the form of any of the displays mentioned hereinabove. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity. Of course, the various modules may also be situated separately or in various combinations of semiconductor platforms per the desires of the user. For example, an embodiment is contemplated where a single-chip computer or game console includes an integrated central processor, graphics processor, etc.

The computer system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enabled the computer system 500 to perform various functions. Memory 504, storage 510 and/or any other storage are possible examples of computer-readable media.

In various embodiments, the architecture and/or functionality of the various other figures may be implemented in the context of the host processor 501, graphics processor 506, a chipset (i.e. a group of integrated circuits designed to work and sold as a unit for performing related functions, etc.), and/or any other integrated circuit for that matter. Still yet, the architecture and/or functionality of the various following figures may be implemented in the context of a general computer system, a circuit board system, a game console system dedicated for entertainment purposes, an application-specific system, and/or any other desired system.

As an option, further included may be a pair of stereo glasses 511 capable of being worn on a face of a user. While the stereo glasses 511 are shown to include two elongated members for supporting the same on the face of the user, it should be noted that other constructions (e.g. member-less design, head strap, helmet, etc.) may be used to provide similar of any other type of support. As further shown, the stereo glasses 511 also include a right eye shutter 514 and a left eye sutter 513.

Both the right eye shutter 514 and left eye shutter 513 are capable of both an open orientation an a close orientation. In use, the open orientation allows more light therethrough with respect to the closed orientation. Of course, such orientations may be archived by and desired mechanical, electrical, optical, and/or any other mechanism capable or carrying out the above functionality.

For control purposes, the stereo glasses 511 may be coupled to a stereo controller 519 via a cable 518 (or without the cable 518 in a wireless environment). In various embodiments, the stereo controller 519 may reside in any location associated with the computer system 500, the stereo glasses 511, and/or even in a separate module, particularly (but not necessarily) in an embodiment where the graphics processor 506 is attached to a separate interface [e.g. universal serial (USB), etc.] on the computer system 500. As shown, in one embodiment, the display 508 may be directly connected to the graphics processor 506, and the stereo controller 519 may further be directly connected to the computer system 500 via a USB interface or any other interface, for that matter. In other embodiments, the stereo controller 519 may be coupled between the graphics processor 506 and the display 508 for carrying out the desired functionality. Of course, the stereo controller 519 may comprise any hardware and/or software capable of the providing such desired functionality.

Specifically, in some embodiments, the right eye shutter 514 and left eye shutter 513 are controlled to switch between the closed orientation and the open orientation. This may be accomplished in any desired manner. Just by way of example, the graphics processor 506 may provide appropriate left/right control signals to the stereo controller 519 over the bus 502, USB interface, etc.

For reasons that will be apparent hereinafter, the right eye shutter 514 and left eye shutter 513 of the stereo glasses 511 may be controlled such that the right eye shutter 514 and left eye shutter 513 simultaneously remain in the closed orientation for a predetermined amount of time. In particular, as will soon become apparent, such technique reduces a duration in which each eye receives content, at least in part, not intended for such eye, resulting in enhanced stereo viewing of content on the display 508.

In addition to and/or instead of the foregoing technique, the stereo controller 519, the display 508, and/or any other appropriate hardware/software associated with the computer system 500 may be equipped with functionality for adapting the display 508 in a way that enhances a viewing experience when display content is viewed utilizing the stereo glasses 511. Specifically, a duration of a vertical blanking interval associated with received display content may be increased for enhancing a viewing experience when the display content is viewed utilizing the stereo glasses 511. By enlarging the vertical blanking interval, the content may be displayed longer for allowing the stereo glasses 511 to remain open longer, thus increasing the apparent brightness to the user, in accordance with one optional embodiment.

As will now be set forth, one embodiment may be provided for compensating for crosstalk that specifically occurs during use of the stereo glasses 511.

Figure 6:
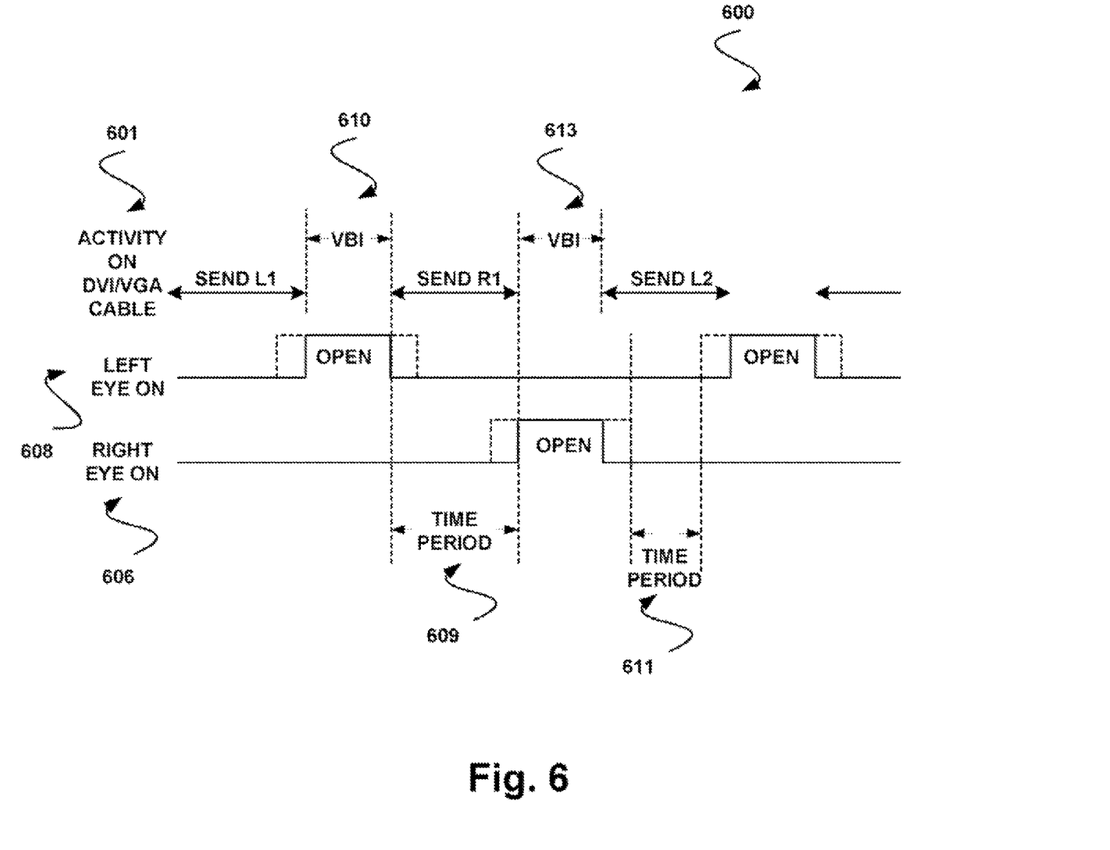
FIG. 6 shows an exemplary timing for enhancing a viewing experience when display content is viewed utilizing stereo glasses, in accordance with one embodiment.

FIG. 6 shows an exemplary timing 600 for enhancing a viewing experience when display content is viewed utilizing stereo glass, in accordance with one embodiment. As shown, a display receives display content over a communication medium 601, such as a digital video interface (DVI) or video graphics array (VGA) cable, or any other medium capable of communicating the display content, for that matter. In FIG. 6, a first left image L1 intended for viewing only by a left eye is shown to be sent over the communication medium 601 first. Thereafter, there is a brief pause in transmission, namely the vertical blanking interval VBI. Next, the first right image R1 intended for only the right eye is then sent, and so forth.

As further shown, a right eye shutter and left eye shutter of the stereo glasses are controlled independently. In one embodiment, this may be accomplished utilizing a right eye control signal 606 for controlling the right eye shutter and a left control signal 608 for controlling the left eye shutter.

Specifically, the left eye shutter of the stereo glasses may be controlled such that the left eye shutter is in an open orientation of at least for the duration of a first set of vertical blanking intervals 610, which follow receipt of display content intended for a left eye. In a similar manner, the right eye shutter of the stereo glasses may be controlled such that the right eye shutter is in the open orientation at least for the duration of a second set of vertical blanking intervals 613, which follow receipt of display content intended for a right eye. As shown, the first set of vertical blanking intervals 610 alternate with the second set of vertical blanking intervals 613, and they both occur between periods during which right eye content or left eye content is received from a content source.

In other embodiments (e.g. particularly in the case of wireless stereo glasses, etc.), the right eye shutter and the left eye shutter of the stereo glasses may be controllers utilizing a plurality of signals (e.g. codes, etc.). In such embodiments, one of such signals may be specifically allocates to cause the right eye shutter and the left eye shutter to simultaneously transition to and remain in the closed orientation. Of course, separate signals may be used to close only the right eye shutter, the left eye shutter, etc.

Thus, in embodiments involving LCDs and other "hold type" displays, a right eye shutter and left eye shutter of the stereo glasses may be controlled such that the right eye shutter and left eye shutter simultaneously remain in the closed orientation for a predetermined amount of time 609. Such predetermined amount of time 609 represents a time during which the first left image L1 has been partially overwritten by the first right image R1. Thus, by ensuring that both the right eye shutter and left eye shutter of the stereo glasses simultaneously remain in the closed orientation during such time, the right eye content is prevented from reaching the left eye and the left eye content is prevented from reaching the right eye.

As mentioned earlier, the duration of the vertical blanking interval VBI associated with received display content may be increased for further enhancing a viewing experience when the display content is viewed utilizing the stereo glasses. By increasing the duration of the vertical blanking interval VBI, the time period is increased during which each eye receives content wholly intended for such eye, resulting in enhanced stereo viewing of content on the display.

More information regarding the foregoing functionality may be identified by reference to a first co-pending application entitled "SYSTEM, METHODS, AND COMPUTER PROGRAM PRODUCT FOR INCREASING AN LCD DISPLAY VERTICAL BLANKING INTERVAL" filed Aug. 4, 2006 under application Ser. No. 11/462,535 and naming the same inventors; and a second co-pending application entitled "SYSTEM, METHOD, AND COMPUTER PROGRAM PRODUCT FOR CONTROLLING STEREO GLASSES SHUTTERS" filed Aug. 4, 2006 under application Ser. No. 11/462,529 and naming the same inventors, which are each incorporated herein by reference in their entirety.

With continuing reference to FIG. 6, in other embodiments, the right eye shutter and the left eye shutter of the stereo glasses may be controlled such that the shutters each remain in the open orientation for an adjustable time period (with the predetermined amount of time 609 being decreased) to permit additional light through each respective shutter. See time period 611, for example. To this end, the eyes of the user may be subjected to more light, thereby enhancing a perceived brightness of an image.

In other words, the left eye shutter of the stereo glasses may be controlled such that the left eye shutter is in the open orientation for a period that exceeds the duration of the first set of vertical blanking intervals 610. Similarly, the right eye shutter of the stereo glasses may be controllers such that the right eye shutter is in the open orientation for a period that exceeds the duration of the second set of vertical blanking intervals 613. Of course, one trade off associated with such option involves increasing the duration in which each eye receives content, at least in part, not intended for such eye. Specifically, at least a portion of left eye content may be displayed when the right eye shutter is in the open orientation, and visa-versa.

It should be noted that the foregoing augmentation may therefore result in more readily evident ghosting near the top and bottom of the display. To deal with such crosstalk, any resultant compensation algorithm may result in stronger compensation near such top and bottom of the display. Such pre-compensation may this take into account the actual opening/closing time of the respective shutters in order to perform the pre-compensation.

In the present embodiment of FIG. 6, crosstalk may further be affected by a response function of each pixel of a display, particularly when a LCD is utilized. Specifically, LCD pixels typically exhibit a response that is a function of a previous value, a current value, and time. For example, a faster response time may be exhibited in situations where there is a larger difference in a magnitude between the previous and current value, and vise-versa. In other words, for lower intensity changes, it may take the LCD pixel a longer duration to achieve the appropriate current values.

Figure 7:
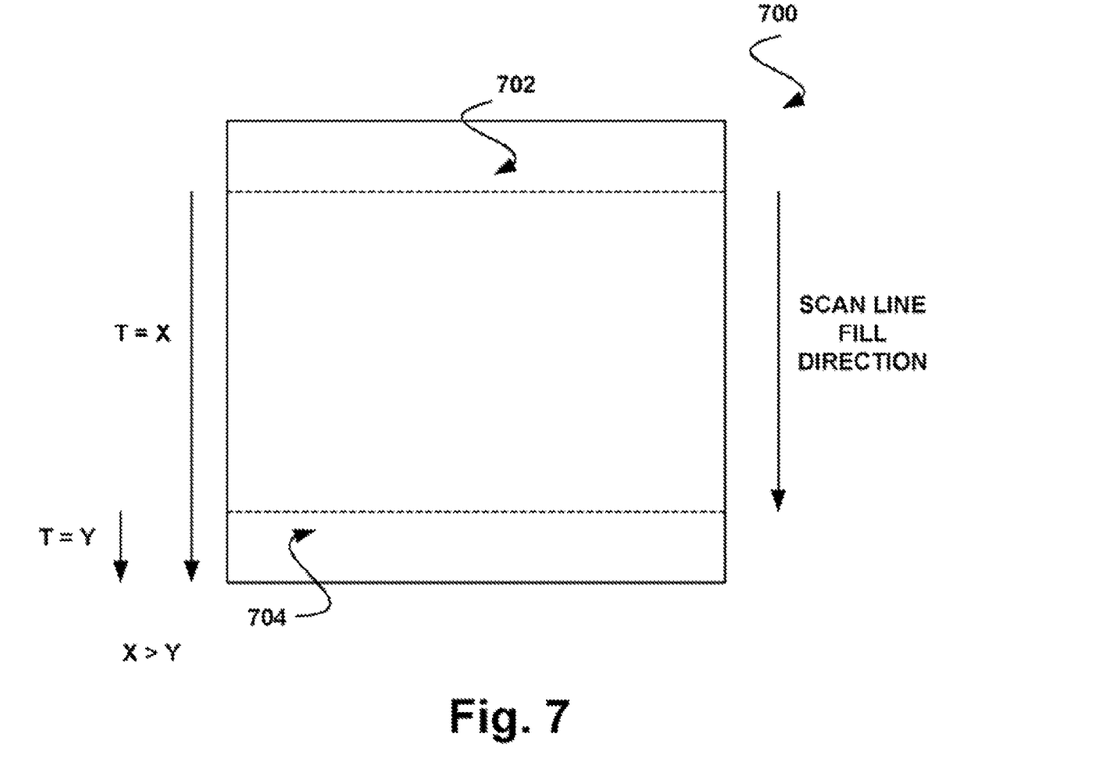
FIG. 7 illustrates a display with a first scan line and a second scan line being written at different times, in accordance with another embodiment.

The response characteristic has particular ramifications of crosstalk. Specifically, FIG. 7 illustrates a display 700 with a first scan line 702 and a second scan line 704. Since scan lines are traditionally written from top to bottom, a time in which each pixel of the first scan line 702 has to reach the current value is T=X and a time in which each pixel of the second scan line 704 has to reach the current value before the shutter glasses are opened is T=Y, with X being greater than Y. Further, since each LCD pixel response function is a function of time, and time is a function of pixel position, it may therefore be inferred that the crosstalk may be a function of pixel position. To this end, as mentioned previously during reference to previous figures, any compensation may also be a function of pixel position.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
    receiving display content for being outputted utilizing a display system that displays an amount of first left eye display content to a right eye of a user in first right eye display content and an amount of second right eye display content to a left eye of the user in second left eye display content;
    determining a first mode of compensation including one of partial compensation and full compensation based on a first brightness level of the first left eye display content and a second brightness level of the first right eye display content;

determining a second mode of compensation including one of the partial compensation and the full compensation based on a third brightness level of the second right eye display content and a fourth brightness level of the second left eye display content; and prior to outputting the display content utilizing the display system, processing the display content, utilizing a graphics processor, to compensate for the amount of the first left eye display content to be displayed to the right eye of the user in the first right eye display content and the amount of the second right eye display content to be displayed to the left eye of the user in the second left eye display content, by:

applying the determined first mode of compensation to the first right eye display content; and applying the determined second mode of compensation to the second left eye display content;

wherein the compensation is performed on a pixel-by-pixel basis by applying equations for each color component of each pixel of a display of the display system.

2. The method as recited in claim 1, wherein the compensation results in the amount of the first left eye display content displayed to the right eye of the user in the first right eye display content being reduced.

3. The method as recited in claim 1, wherein the compensation results in the amount of the second right eye display content displayed to the left eye of the user in the second left eye display content being reduced.

4. The method as recited in claim 1, wherein the compensation is performed as a function of a value of a red component value of a pixel that is a source of crosstalk, a green component value of a pixel that is a source of crosstalk, and a blue component value of a pixel that is a source of crosstalk.

5. The method as recited in claim 4, wherein the pixel that is the source of the crosstalk includes a pixel of an image intended for viewing by a different eye.

6. The method as recited in claim 4, wherein the pixel that is the source of the crosstalk includes a pixel of a previously displayed image.

7. The method as recited in claim 1, wherein the compensation is performed as a function of a pixel location.

8. The method as recited in claim 7, wherein the compensation is performed as a function of a scan line associated with a pixel.

9. The method as recited in claim 1, wherein the compensation is adapted for enhancing a display of the display content in association with shutter glasses.

10. The method as recited in claim 9, wherein the compensation is adapted for enhancing the display of the display content utilizing the display that includes a liquid crystal display in association with the shutter glasses.

11. The method as recited in claim 1, wherein the compensation includes increasing a black level of at least a portion of the display content.

12. The method as recited in claim 1, wherein the display system includes at least one of a dual projector, a time sequential display, and a lenticular display.

13. The method as recited in claim 1, wherein the graphics processor includes a graphics processing unit.

14. The method as recited in claim 1, wherein the compensation is performed utilizing a look-up operation.

15. The method as recited in claim 1, wherein the compensation is performed utilizing a shader program.

16. The method as recited in claim 1, wherein the compensation is performed utilizing a look-up operation involving a table that provides the equations and values that are based on specific variations of input indicative of a specific crosstalk to be combated.

17. The method as recited in claim 1, wherein the compensation is performed on the pixel-by-pixel basis for each pixel of the display as a function of a pixel location including x and y coordinates of the pixel, a red component value, a green component value and a blue component value of the pixel, and a previous red component value, a previous green component value and a previous blue component value of the pixel.

18. The method as recited in claim 1, wherein the compensation is performed utilizing an algorithm that compensates pixels located at a top and a bottom of the display stronger than pixels located in a middle of the display.

19. The method as recited in claim 1, wherein the compensation is performed utilizing a shader program that defines surface properties of objects to be displayed.

20. The method as recited in claim 1, wherein the compensation is performed on the pixel-by-pixel basis for each pixel of the display by providing, for each pixel of the display, compensation for each color component of the pixel of the display.

21. The method as recited in claim 1, wherein the partial compensation includes multiple different levels of compensation each capable of being determined to be the first mode of compensation and the second mode of compensation.

22. The method as recited in claim 1, wherein the partial compensation and the full compensation include different levels of an increase in a black level.

23. The method as recited in claim 1, wherein the full compensation includes increasing a black level a same percentage of which display content intended for one eye leaks to another eye.

24. The method as recited in claim 1, wherein the partial compensation includes increasing a black level a percentage less than a percentage of which display content intended for one eye leaks to another eye.

25. A computer program product embodied on a computer readable medium, comprising:

computer code for identifying display content for being outputted utilizing a display system that displays an amount of first left eye display content to a right eye of a user in first right eye display content and an amount of second right eye display content to a left eye of the user in second left eye display content;

computer code for determining a first mode of compensation including one of partial compensation and full compensation based on a first brightness level of the first left eye display content and a second brightness level of the first right eye display content;

computer code for determining a second mode of compensation including one of the partial compensation and the full compensation based on a third brightness level of the second right eye display content and a fourth brightness level of the second left eye display content; and computer code for processing the display content, utilizing a graphics processor, to compensate for the amount of the first left eye display content to be displayed to the right eye of the user in the first right eye display content and the amount of the second right eye display content to be displayed to the left eye of the user in the second left eye display content, prior to outputting the display content utilizing the display system, by:

applying the determined first mode of compensation to the first right eye display content; and applying the determined second mode of compensation to the second left eye display content;

wherein the graphics processor is utilized such that the compensation is performed on a pixel-by-pixel basis by applying equations for each color component of each pixel of a display of the display system.

26. A system, comprising a display that displays an amount of first left eye display content to a right eye of a user in first right eye display content and an amount of second right eye display content to a left eye of the user in second left eye display content;

a processor in communication with the display, the processor for:

determining a first mode of compensation including one of partial compensation and full compensation based on a first brightness level of the first left eye display content and a second brightness level of the first right eye display content;

determining a second mode of compensation including one of the partial compensation and the full compensation based on a third brightness level of the second right eye display content and a fourth brightness level of the second left eye display content; and processing the left eye display content and the right eye display content to compensate for the amount of the first left eye display content to be displayed to the right eye of the user in the first right eye display content and the amount of the second right eye display content to be displayed to the left eye of the user in the second left eye display content, as a function of at least one pixel location, by:

applying the determined first mode of compensation to the first right eye display content; and applying the determined second mode of compensation to the second left eye display content;

wherein the processor is operable such that the compensation is performed on a pixel-by-pixel basis by applying equations for each color component of each pixel of the display.

27. The system as recited in claim 26, wherein the display includes a liquid crystal display.

28. The system as recited in claim 26, wherein the at least one pixel location is determined based on a scan line associated with a pixel.

\* \* \* \* \*